(No Model.)
O. H. HICKS.
FIXTURE FOR HOLDING ROLL PAPER.
No. 564,688. Patented July 28, 1896.
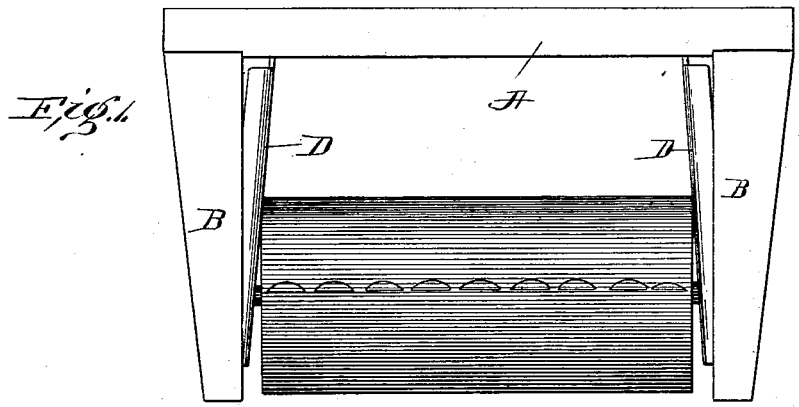
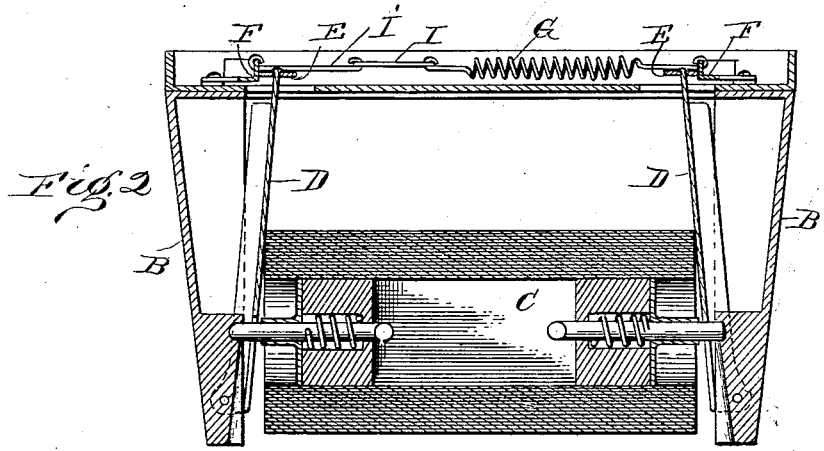
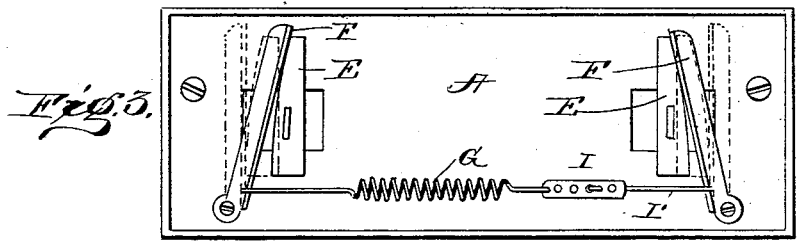
Witnesses:
J. M. Fowler Jr.
Thomas Durant
Inventor:
Oliver H. Hicks,
by Church & Church
his Attorneys.

UNITED STATES PATENT OFFICE.

OLIVER H. HICKS, OF CHICAGO, ILLINOIS, ASSIGNOR TO THE MORGAN ENVELOPE COMPANY, OF SPRINGFIELD, MASSACHUSETTS.

FIXTURE FOR HOLDING ROLL-PAPER.

SPECIFICATION forming part of Letters Patent No. 564,688, dated July 28, 1896.

Application filed February 8, 1896. Serial No. 578,574. (No model.)

*To all whom it may concern:*

Be it known that I, OLIVER H. HICKS, of Chicago, in the county of Cook, State of Illinois, have invented certain new and useful Improvements in Fixtures for Holding Roll-Paper; and I do hereby declare the following to be a full, clear, and exact description of the same, reference being had to the accompanying drawings, forming a part of this specification, and to the letters of reference thereon.

My present invention relates to improvements in fixtures for holding roll-paper, particularly toilet-paper fixtures, the objects of the invention being to provide an improved friction-brake for the roll which will act to retard the rotation of the roll to a uniform degree regardless of the diameter of the roll or the reduction in the diameter of the roll incident to use.

Referring to the accompanying drawings, Figure 1 is a top plan view of a toilet-paper fixture embodying my present invention with a partially-consumed roll thereon. Fig. 2 is a section through the same in a horizontal plane. Fig. 3 is a view showing the spring and differential connections for the brake or friction-pieces.

Like letters of reference in the several figures indicate the same parts.

The wall-plate or base A, having the supports or hangers B for the roll, together with the core C, may be of any desired or approved character, those illustrated being cast with recesses, however, for containing the working parts of the brake mechanism.

The brake mechanism consists, primarily, of a friction plate or plates D, as I preferably, though not necessarily, employ one at each end of the roll, advanced by spring action so as to take a frictional bearing against the end or ends of the roll, at or near its periphery, and so retard or offer a resistance to the rotation of the same, thereby preventing waste and insuring a separation of the web at the lines of weakness if the roll is formed of a perforated web, as is usually the case with toilet-paper.

I prefer to form pivotal bearings for these friction-plates at or near their front ends and to apply the spring to the rear ends to insure the engagement of the friction-plates with the ends of the roll near the periphery, and in order that the pressure on the plates may vary in accordance with the decrease in the diameter of the roll, so as to insure a uniform resistance, a differential connection is interposed between the spring and friction-plates, which causes the plates to be advanced with greater pressure when they are separated more widely, as by a roll of large diameter, which pressure decreases as the diameter of the roll decreases.

A variety of forms of differential connections will at once suggest themselves to those skilled in the art, but I have devised a simple form which may be entirely concealed in the recess in the back of the wall-plate, and consisting of an arm E on each friction-plate, preferably having a curved bearing edge against which levers F, pivoted to the wall-plate and advanced by an adjustable connecting-spring G, bear. The levers are pivoted in such relation to the bearing-arms as that the points of contact will be near the fulcrums when the friction-plates are separated widely by a roll of large diameter, and as the plates move toward each other as the diameter of the roll decreases the bearing-points will move out toward the ends of the levers. Hence the power of the levers decreases in exact proportion to the diameter of the roll.

The adjusting devices for the spring may consist simply of a perforated plate I and hooked rod I', interposed in the spring connection, or any obvious form of adjusting mechanism may be employed, and while I have described and illustrated the spring as extending between the levers it is obvious that separate springs may be employed or that the lever at one end may be entirely omitted, reliance being placed on one movable friction-plate to create sufficient friction to retard the roll.

The friction-plates D are preferably rigid or made of metal which is sufficiently heavy not to yield to any material extent under the strains to which it is subjected.

Having thus described my invention, what I claim as new is—

1. In a roll-paper fixture, the combination with the roll-support, of a rigid friction-plate having a pivotal bearing on the support at one end and a spring for advancing its opposite end, said plate having its friction-surface arranged to exert its greatest pressure on the end of the roll at or near its periphery; substantially as described.

2. In a roll-paper fixture, the combination with the roll-support, of a friction-plate forming a brake for the roll, a spring for advancing the plate and a differential connection interposed between the spring and plate, whereby as the plate advances the effective pressure exerted by the spring decreases; substantially as described.

3. In a roll-paper fixture, the combination with the roll-support, of a friction-plate having its friction-surface arranged to engage the roll at or near the periphery, a spring for advancing the plate and a differential connection interposed between the spring and plate whereby as the roll is consumed the effective power of the spring decreases; substantially as described.

4. In a roll-paper fixture, the combination with the roll-support, of a friction-plate having its friction-surface arranged to engage the roll at or near the periphery, a bearing-arm on said plate having an extended bearing, and a pivoted spring-pressed lever coöperating with the bearing-surface of said arm to exert a gradually-diminishing pressure as the friction-plate advances; substantially as described.

5. In a roll-paper fixture, the combination with the roll-support, of the oppositely-arranged friction-plates having their friction-surfaces arranged to engage the roll at or near its periphery, a spring and differential connections between the spring and plates, whereby as the diameter of the roll decreases the effective power of the spring decreases; substantially as described.

6. In a roll-paper fixture, the combination with the roll-support, of the oppositely-arranged friction-plates having their friction-surfaces arranged to engage the roll at or near its periphery, arms on said plates, pivoted levers engaging said arms and a spring connecting the levers; substantially as described.

OLIVER H. HICKS.

Witnesses:
J. H. LEE,
RICHARD SPENCER.